UNITED STATES PATENT OFFICE.

ALFRED PARAF, OF MULHOUSE, FRANCE.

IMPROVEMENT IN PRINTING AND DYEING COTTON, LINEN, &c.

Specification forming part of Letters Patent No. 50,885, dated November 7, 1865.

*To all whom it may concern:*

Be it known that I, ALFRED PARAF, of Mulhouse, in the Empire of France, now residing in the city of Manchester, in the county of Lancaster and Kingdom of England, have invented new and useful Improvements in Dyeing and Printing; and I do hereby declare that the following is a full and exact description thereof—that is to say:

This invention consists in the production of a black color upon cotton or linen fabrics or yarns by either of the processes of dyeing or printing, in which I use a salt of aniline or its homologues, or a mixture of the same decomposed by any salt or mineral acid, organic acid, or a mixture thereof which is not liable to injure the fabrics or yarns, in conjunction with a mixture of the chlorates of the alkalies or alkaline earths; and although the process may be varied as to the kind of acid used or salt of aniline employed, I obtain good results with the following mixtures or proportions.

I prepare or impregnate the cloth or yarn with a mixture of about half an ounce of arsenious acid, five ounces of chlorate of potash, and one gallon of boiling water, and then dry the goods without washing. I then print, dye, or pad upon it the mixture of about two pounds of black liquor to one gallon of thickening. The said black liquor consists of one part of muriate aniline (very acid) and one part of hydrofluosilicic acid at 11° Twaddle, and boil until it is dissolved. I prepare the hydrofluosilicic acid by decomposing a mixture of sparfluor and sand with sulphuric acid. After printing or dyeing, I age in a damp room at about 90° to 95° heat, till a very dark olive-green shade appears, and by passing the goods through any alkaline solution or soap and water the required black is produced.

By this process the following reaction takes place: The fluosilicic acid from the black liquor forms fluosilicate of potash with the potash of the chlorate, the chloric acid coming free. One part of that chloric acid goes to the aniline of the chloride of aniline. The other part transforms the chloride of the same salt of aniline in free chlorine; and this mixture of chloric acid and free chlorine upon aniline gives the black.

In using the chlorate of potash in the color the cloth or yarn does not require any preparing process; but I use for one gallon of color two pounds of black liquor to one pound of chlorate of potash.

Or, as another modification of my process, I use fluosilicate of aniline in crystals, which I print upon or mix with a mixture of chlorate and chloride of potash, by which I obtain very good results. I prepare the fluosilicate of aniline in crytals by bringing to the necessary heat a solution of hydrofluosilicic acid in water at 11° Twaddle, and add to it by degrees as long as it will dissolve any pure aniline. I then cool down and purify the crystals by washing them in cold water. By this reaction the fluosilicic acid transforms the mixture of chlorate and chloride of potash into fluosilicate of potash, giving free chlorine and chloric acid, which forms the black with the aniline of the fluosilicate.

I have another modified process by the action of chlorate of aniline upon free chlorine, in which I prepare the chlorate of aniline by treating fluosilicate of aniline with chlorate of potash in excess, it giving fluosilicate of potash and chlorate of aniline. The cloth or yarn is prepared in a mixture of chloride of magnesium and bisulphate of potash, and the chlorate of aniline printed upon it. By aging the following reaction takes place: The bisulphate of potash transforms the chloride of magnesium into sulphate of magnesia and sets the muriatic acid at liberty, which is transformed into free chlorine by the chloric acid of the chlorate of aniline, and the black is produced by the same means.

The advantages of these improved processes are, first, a more splendid shade than has hitherto been produced; secondly, a perfectly-fast color; thirdly, I am able to print with any madder, garancine or alizarine colors, with the advantage of giving a shade of black hitherto unknown, and this without forming any white edges, and by dispensing with the madder the coloring-matter is considerably cheaper; fourthly, this process can be used with advantage for padding in plain blacks.

Having thus described the nature and particulars of my said invention and the manner of carrying it into practical effect, I desire it to be understood that I claim—

The producing an aniline black upon fabrics or yarns by the action of chloric acid and free chlorine upon aniline or its homologues, or any mixture of the same, as herein described, or any modification thereof.

Dated at Manchester this 20th day of July, 1865.

Witnesses:         ALFRED PARAF.
    EDWARD JOSEPH HUGHES,
    JOHN BLOODWORTH,
*Patent Agents, both of No. 20 Cross Street, Manchester.*